United States Patent [19]

Rau et al.

[11] 4,181,042

[45] Jan. 1, 1980

[54] DRIVE ASSEMBLY

[75] Inventors: Jim L. Rau; Mark R. Kinder, both of Lafayette, Ind.

[73] Assignee: TRW Inc., Cleveland, Ohio

[21] Appl. No.: 750,137

[22] Filed: Dec. 13, 1976

[51] Int. Cl.$^2$ .................. F16D 13/52; F16D 25/00; F16H 3/44; F16H 35/00

[52] U.S. Cl. .................... 74/750 R; 74/391; 74/759; 74/785; 180/255; 192/89 B; 192/91 A; 192/97

[58] Field of Search ............... 74/391, 785, 788, 769, 74/768, 765, 764, 759, 758, 750 R; 180/43 B; 192/4 A, 13 R, 48.5, 12 C, 18 A, 91 A, 89 A, 89 B, 89 R, 94, 97, 67 R

[56] References Cited

U.S. PATENT DOCUMENTS

| | | | |
|---|---|---|---|
| 680,825 | 8/1901 | Westinghouse | 74/785 |
| 1,122,020 | 12/1914 | Michaelson | 192/89 A X |
| 1,228,472 | 6/1917 | Olson | 74/785 |
| 1,301,592 | 4/1919 | Ovren | 74/391 X |
| 2,402,951 | 7/1946 | DePew | 74/768 |
| 2,729,298 | 1/1956 | LeTourneau | 192/13 R X |
| 3,115,204 | 12/1963 | Dence | 74/785 |
| 3,308,686 | 3/1967 | Magg et al. | 74/752 C |
| 3,442,361 | 5/1969 | Hegar | 192/67 R |
| 3,504,564 | 4/1970 | Kell | 74/391 X |
| 3,678,783 | 7/1972 | O'Malley et al. | 74/759 |
| 3,770,075 | 11/1973 | Vegners | 180/43 B X |
| 3,969,950 | 7/1976 | Rau et al. | 74/391 X |
| 4,026,167 | 5/1977 | Archer | 74/785 |
| 4,043,226 | 8/1977 | Buuck | 74/785 X |

FOREIGN PATENT DOCUMENTS 932290 7/1963 United Kingdom .................. 74/785

*Primary Examiner*—Mervin Stein
*Assistant Examiner*—Carl F. Pietruszka

[57] ABSTRACT

A drive assembly includes a casing containing a planetary gear assembly. A speed control arrangement is provided in association with the planetary gear assembly to vary the speed of rotation of an output member relative to the speed of rotation of an input member. The speed control arrangement includes a first disc pack which is engaged under the influence of a spring to prevent relative rotation between a ring gear and a planet carrier. A second disc pack is also engageable under the influence of a spring to prevent rotation of the ring gear relative to the casing. Hydraulic motors are selectively operable to release the disc packs against the influence of the associated springs. In the event of a failure in the source of hydraulic fluid, both disc packs are engaged with a resulting braking of rotation of the driven wheel. A secondary or towing clutch is selectively disengageable to release the output member and wheel for rotation, even though both of the disc packs are engaged. The springs cooperate with the disc packs in such a manner that wear is minimized. Compact construction of the drive assembly is promoted by eliminating the use of bearings to hold the ring gear against sidewise movement. The compact construction of the drive assembly is also promoted by forming the ring gear with a pair of annular side sections which have the same inside diameter and which extend axially outwardly from opposite sides of the ring gear into engagement with disc packs.

18 Claims, 7 Drawing Figures

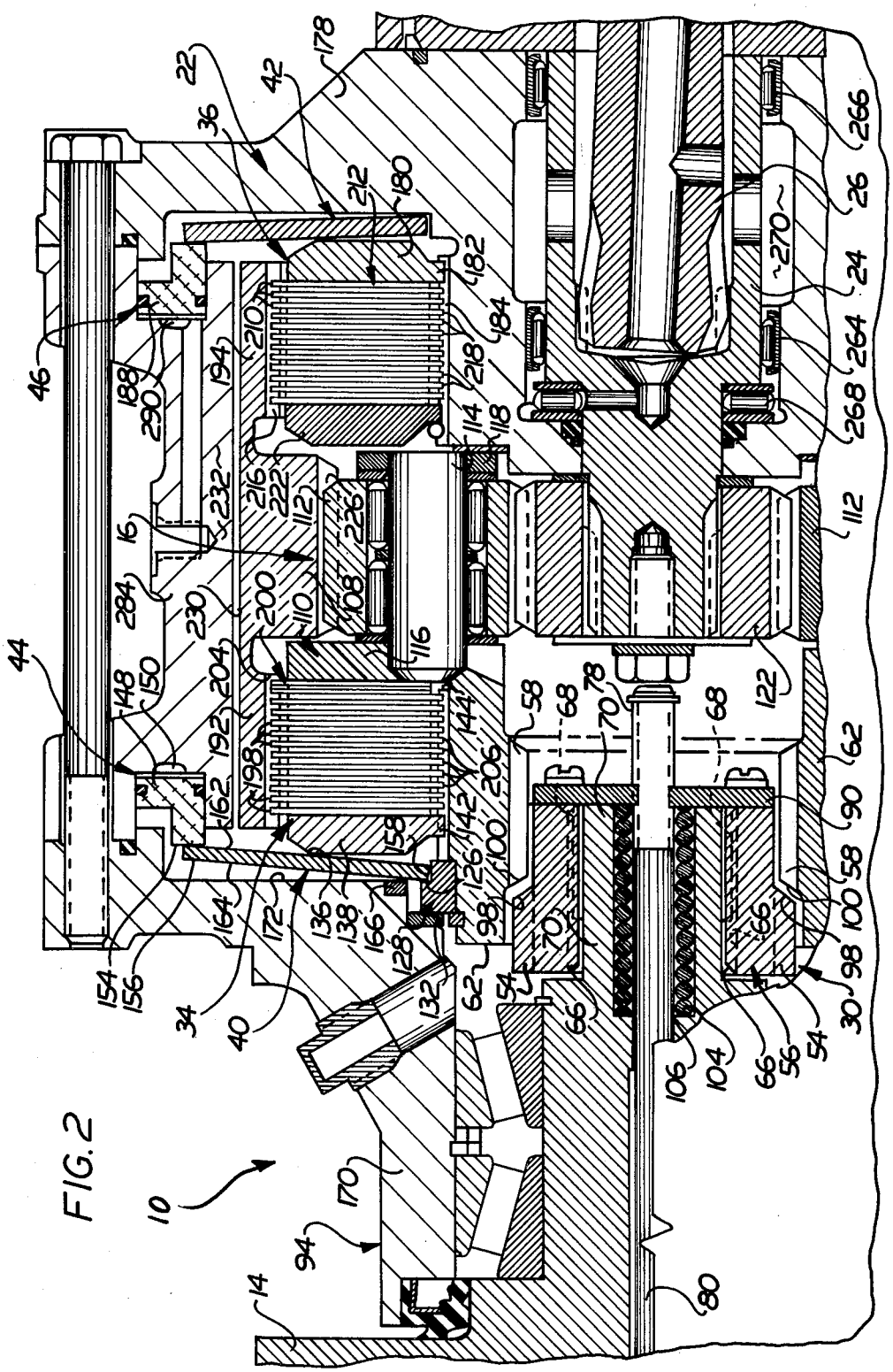

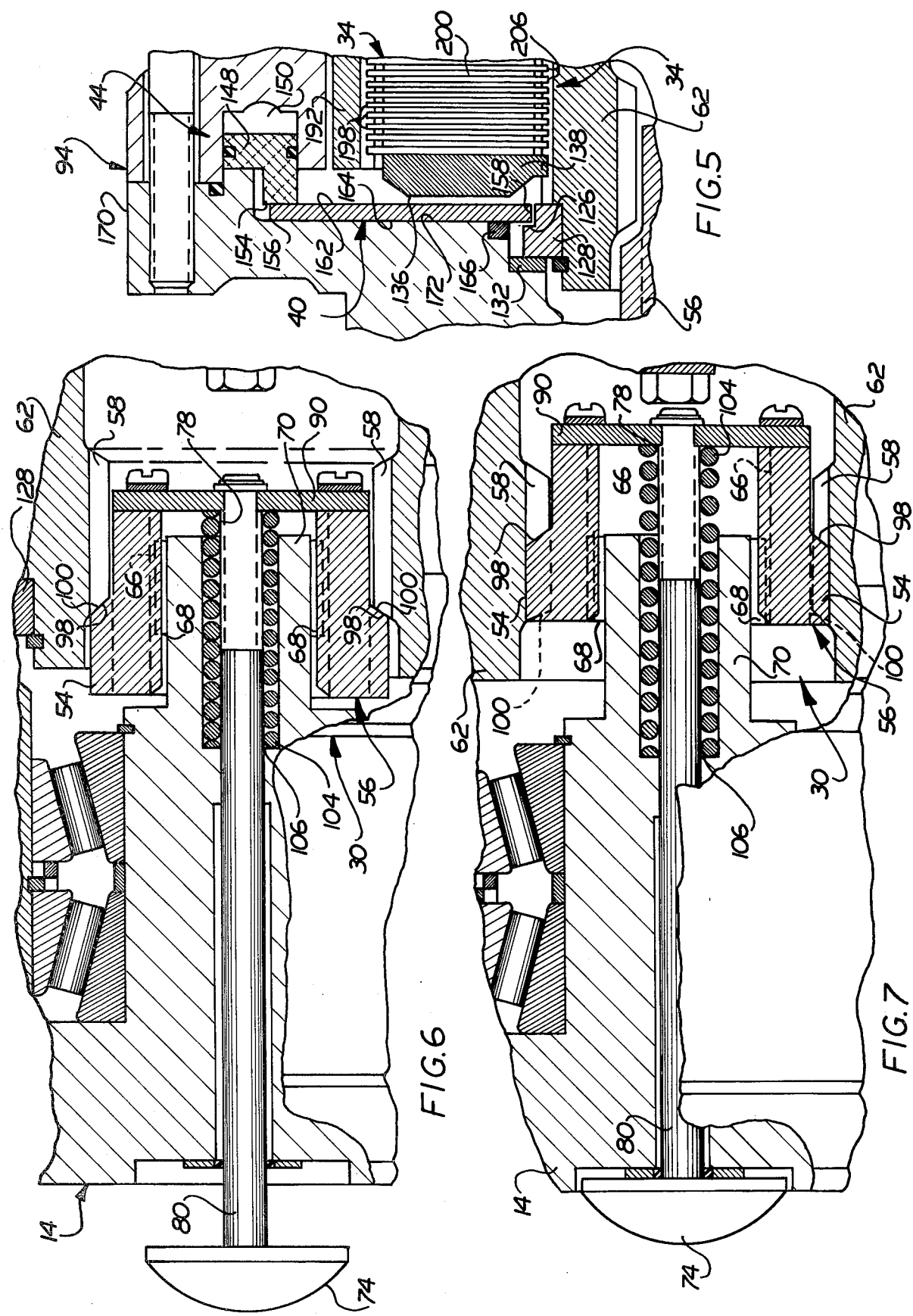

DRIVE ASSEMBLY

BACKGROUND OF THE INVENTION

This invention relates to a new and improved drive assembly and more specifically to a drive assembly in which planetary gears are utilized to transmit drive forces between input and output members. A clutch and brake arrangement is advantageously associated with the planetary gears to effect a change in the speed of rotation of the output member relative to the speed of rotation of the input member.

Planetary gear assemblies have previously been utilized in association with various clutch and brake arrangements to effect a variation in the speed of rotation of an output member relative to an input member. Certain known transmissions having clutches in association with planetary gear assemblies are disclosed in U.S. Pat. Nos. 2,293,050; 2,373,122; 2,870,655; 3,296,893; 3,308,686; 3,319,492 and in Italian Pat. No. 957,342. Various planetary gear assemblies have also been utilized to drive the wheels of a vehicle in the manner disclosed in U.S. Pat. Nos. 2,893,268; 3,217,826; 3,653,454; 3,686,978 and 3,969,950. In addition to the wheel drive arrangements disclosed in the aforementioned patents, it has been suggested that clutches could be provided in association with the planetary gear assembly to effect a variation in the speed of rotation of an output member relative to the speed of rotation of an input member.

When a planetary gear assembly is utilized to drive the wheels of a vehicle, it is advantageous to provide a clutch in the output from the gear assembly to enable the vehicle to be towed without actuating the planetary gear assembly. Such an arrangement is disclosed in the aforementioned U.S. Pat. Nos. 3,686,978 and 3,969,950.

SUMMARY OF THE PRESENT INVENTION

The present invention provides a new and improved drive assembly which includes a plantary gear assembly and a clutch and a brake to effect a variation in the speed of rotation of an output member relative to the speed of rotation of an input member. The clutch and brake are actuated from an engaged condition to a disengaged condition under the influence of fluid pressure. If both of the clutch and brake are in the engaged condition, the brake assembly is locked in such a manner that the output member can not rotate. In order to enable the output member to be rotated when a pump or other source of fluid for actuating the clutch and brake is ineffective to supply fluid under pressure, a secondary or towing clutch is provided in association with the output from the drive assembly. By releasing the secondary clutch, the output member can be freely rotated.

In accordance with another feature of the present invention, wear between various parts of the drive assembly is minimized. To accomplish this, springs for effecting actuation of the clutches associated with the planetary gear assembly are associated with parts of the drive assembly so that minimum relative rotation of the springs and parts occurs which could result in wear.

The ring gear of the planetary gear assembly is free to shift axially relative to the planet gears to thereby distribute the ring gear tooth wear caused by the planet gear teeth over a relatively large area of the ring gear teeth. The freedom of the ring gear to shift axially is obtained by eliminating relatively bulky and expensive bearing arrangements which have been previously utilized to support the ring gear for rotation and to hold the ring gear against axial movement relative to the planet gears. The compact construction of the drive assembly is further promoted by providing a relatively simple interconnection between the ring gear and a pair of disc packs which are utilized to retard relative rotation between the ring gear and either the planet carrier or the casing of the drive assembly. This simple interconnection is obtained by forming the ring gear with a pair of side sections having teeth or splines which engage discs. The teeth or splines on the two side sections have the same diameter to facilitate the forming of the ring gear and side sections.

Accordingly, it is an object of this invention to provide a new and improved drive assembly having a speed control arrangement associated with planetary gearing, the speed control arrangement being actuatable from an engaged condition locking on output member and the planetary gearing against rotation and wherein a towing clutch is disengageable to release the output member in the event that fluid pressure is unavailable to effect actuation of the speed control arrangement to the disengaged condition.

Another object of this invention is to provide a new and improved drive assembly having a disc pack assembly in association with a planetary transmission and wherein a spring for operating the disc pack assembly is maintained free of frictional engagement with relatively moving surfaces when the disc pack assembly is in either an engaged condition or a disengaged condition.

Another object of this invention is to provide a new and improved drive assembly having a planetary gear arrangement in which a ring gear has a pair of side sections of the same diameter, the ring gear side sections being connected with a pair of disc packs which are selectively engageable.

Another object of this invention is to provide a new and improved drive assembly having a planetary gear arrangement in which a ring gear is supported for combined rotational and axial movement relative to a casing and in which axial movement of the ring gear is unimpeded by bearings.

BRIEF DESCRIPTION OF THE DRAWINGS

The foregoing and other objects and features of the present invention will become more apparent upon a consideration of the following description taken in connection with the accompanying drawings wherein:

FIG. 2 is an enlarged fragmentary sectional view of a portion of the drive assembly of FIG. 1;

FIG. 5 is an enlarged fragmentary view illustrating the manner in which a clutch actuating spring is moved out of engagement with bearing surfaces which rotate relative to each other when the clutch is disengaged;

FIG. 6 is a fragmentary sectional view illustrating the manner in which a secondary or towing clutch is actuated to an intermediate condition in which teeth on a pair of clutch members are misaligned; and FIG. 7 is a fragmentary sectional view, generally similar to FIG. 6, illustrating the clutch members of FIG. 6 in an engaged condition after the teeth on the clutch member have moved into alignment.

DESCRIPTION OF ONE SPECIFIC PREFERRED EMBODIMENT OF THE INVENTION

General Construction of Drive Assembly

Figure 1:
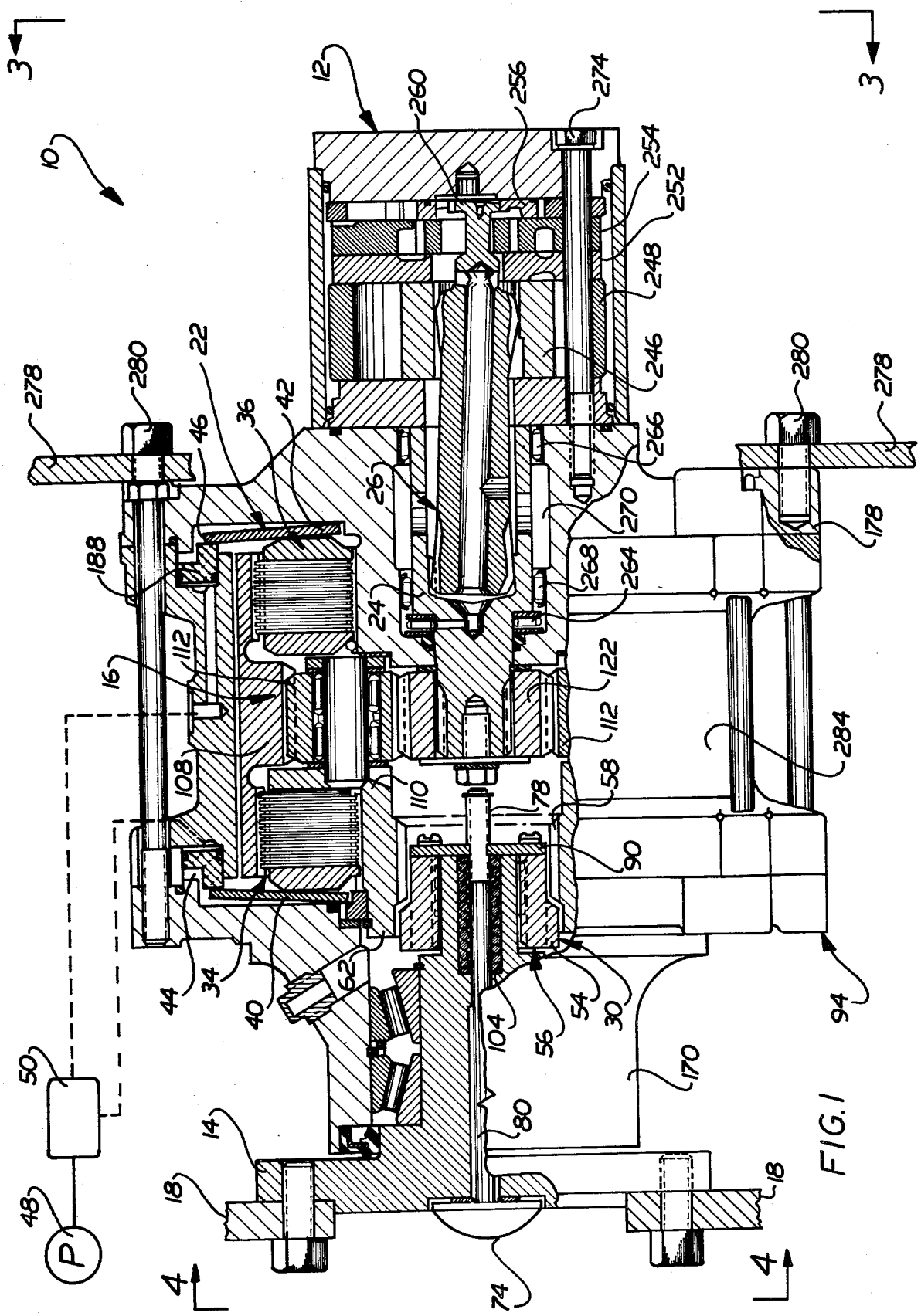
FIG. 1 is a partially broken away sectional view of a drive assembly constructed in accordance with the present invention.

A drive assembly 10 constructed in accordance with the present invention is illustrated in FIG. 1 and includes a hydraulic motor 12 which is utilized to drive an output member 14 through a planetary transmission or gear assembly 16. Although the output member 14 is connected with the rim 18 of a vehicle wheel, it is contemplated that the output member 14 could be connected with other driven members in environments other than in association with a vehicle. A primary or speed control arrangement 22 is utilized in association with the planetary gear assembly 16 to vary the rate of rotation with the output member 14 relative to the rate of rotation of an input member 24 connected with a motor output or wobble shaft 26. A secondary or towing clutch assembly 30 is provided to enable the output member 14 to be selectively disconnected from the planetary gear assembly 16.

The speed control arrangement 22 includes a pair of coaxial disc assemblies 34 and 36 which are capable of being independently engaged and disengaged to effect operation of the drive assembly 10 in any one of four modes. Disc assembly 34 is referred to herein also as a clutch assembly and disc assembly 36 is also referred to herein as a brake assembly. When both of the disc assemblies 34 and 36 are engaged, the planetary gear assembly 16 is locked up and the output member 14 is held against rotation as long as the secondary or towing clutch 30 is engaged (FIG. 7). Upon disengagement of the clutch assembly 34 (FIG. 1) with the brake assembly 36 engaged, the output member 14 is rotated at a low speed relative to the speed of rotation of the input member 24. Upon disengagement of the brake assembly 36 with the clutch assembly 34 engaged, the output member 14 is rotated at the same rate as the input member 24. Finally, if both of the disc assemblies 34 and 36 are disengaged, a neutral condition exists in which the output member 14 is freely rotatable relative to the input member 24 and the input member is ineffective to drive the output member.

The disc assemblies 34 and 36 (FIG. 1) are actuated to their engaged conditions by a pair of belleville type springs 40 and 42. To disengage the disc assemblies 34 and 36, a pair of fluid motors 44 and 46 are operated under the influence of fluid pressure transmitted from a pump 48 through a valve assembly 50. Operation of the fluid motors 44 and 46 deflects the springs 40 and 42 outwardly away from the associated disc packs 34 and 36. This results in disengagement of the disc packs. It should be noted that in the event that the pump 48 is ineffective to supply fluid under pressure to the motors 44 and 46 due to either a shutting down of a motor for driving the pump or due to a malfunctioning of the pump, the springs 40 and 42 will automatically cause the disc packs 34 and 36 to become engaged to lock up the planetary transmission 16 and hold the output member 14 against rotation when the clutch assembly 30 is engaged.

Secondary or Towing Clutch

It is contemplated that under certain circumstances it may be desirable to allow the output member 14 to be rotated when the pump 48 is ineffective to supply fluid pressure to the motors 44 and 46 to effect disengagement of the disc assemblies 34 and 36. For example, this situation could occur when a vehicle with which the wheel drive assembly 10 is associated is being towed or when there has been a malfunctioning of either the pump 48 or its drive motor. To enable the wheel connected with the output member 14 to be rotated when both of the disc assemblies 34 and 36 are engaged, the secondary or towing clutch 30 is actuated from the engaged condition as shown in FIG. 7 to the disengaged condition shown in FIG. 1.

When the secondary clutch 30 is in the engaged condition shown in FIG. 7, an annular array of teeth 54 on the outside of a cylindrical clutch member 56 are disposed in meshing engagement with an annular array of teeth 58 formed on the inside of a cylindrical transmission output member 62 which is connected directly with the planetary gear assembly 16 (see FIG. 2). When the clutch member 56 is in the engaged position illustrated in FIG. 7, drive forces are transmitted from the transmission output member 62 through the clutch member to the output member 14. To provide for the transmission of force between the clutch member 56 and the output member 14, an annular array of teeth 66 formed on the inside of the clutch member 56 are disposed in meshing engagement with an annular array of teeth 68 formed on the outside of a cylindrical end portion 70 of the output member 14. Therefore, upon rotation of the transmission output member 62 by the planetary gear assembly 16 with the clutch member 56 in the engaged condition, the output member 14 is rotated at the same speed as the transmission output member 62.

Figure 4:
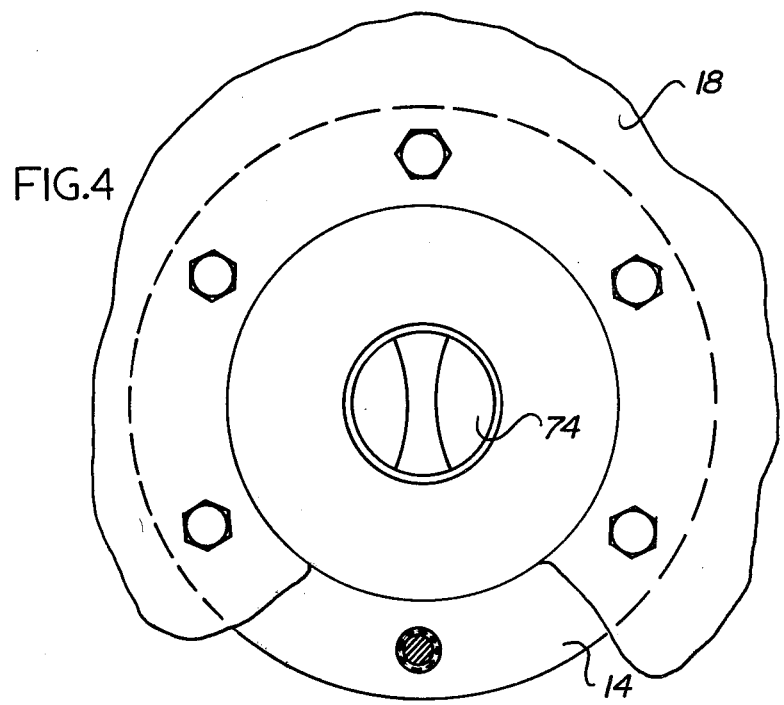
FIG. 4 is a view, taken generally along the line 4—4 of FIG. 1 illustrating the manner in which a driven member, such as a wheel, is connected with the drive assembly.

To effect axial movement of the clutch member 56 from the engaged position of FIG. 7 to the disengaged position of FIGS. 1 and 2, a manually engageable clutch actuator knob 74 (FIGS. 1 and 4) is rotated. Rotation of the actuator knob 74 causes screw threads 78 (FIG. 2) formed on an inner end of an actuator shaft 80 to move an internally threaded circular end wall 90, toward the left from the position shown in FIG. 7 to the position shown in FIG. 2. The end wall 90 is fixedly connected to the clutch member 56. Therefore, leftward movement of the end wall 90 moves the clutch member 56 from the engaged position shown in FIG. 7 to the disengaged position shown in FIG. 2.

When the clutch member 56 is in the disengaged position shown in FIG. 2, the external teeth 54 on the clutch member are spaced apart from the internal teeth 58 on the transmission output member 62. Therefore, the planetary gear assembly 16 is ineffective to drive the output member 14 and the output member 14 can be freely rotated relative to a casing 94 which encloses the planetary gear assembly 16. Of course, this enables the output member 14 to be rotated when the disc assemblies 34 and 36 are held in the engaged condition locking the transmission output member 62 against rotation.

When the secondary clutch 30 is to be operated from the disengaged condition of FIG. 2 back to the engaged condition of FIG. 7 to provide for the transmission of drive forces from the planetary gear assembly 16 to the output member 14, it is necessary to move the teeth 54 on the clutch member 56 into meshing engagement with the teeth 58 on the transmission output member 62 in the manner shown in FIG. 7. To accomplish this, the clutch actuator shaft 80 is rotated to cause the threads 78 on the end of the shaft to move the end wall 90 toward the right (as viewed in FIG. 2). If the external teeth 54 on the clutch member 56 are exactly aligned with spaces between the internal teeth 58 on the transmission output member 62, continued rotation of the clutch actuator shaft 80 causes the clutch member 56 to be moved from the disengaged position of FIG. 2 to the engaged position of FIG. 7. However in all probability, the teeth 54 on the clutch member 56 will not be aligned with the teeth 58 on the transmission output member 52. Due to the misalignment of the two sets of teeth 54 and 58, the leading ends 98 of the teeth 54 move into abutting engagement with the outer ends 100 of the teeth 58 in the manner illustrated in FIG. 6. Due to this abutting engagement between the two annular arrays of teeth 54 and 58, continued rotation of the clutch actuator shaft 80 will merely cause the actuator shaft to project outwardly from the output member 14 in the manner illustrated in FIG. 6.

When the clutch member 56 is in the intermediate position of FIG. 6, operation of the motor 12 or rotation of the wheel rim 18 will cause relative rotation between the output member 14 and the transmission output member 62. This relative rotation enables the two sets of teeth 54 and 58 to move into alignment. Once the teeth 54 and 58 have moved into alignment, a coil spring 104 will cause the clutch member 56 to snap inwardly, to the engaged position of FIG. 7. The coil spring 104 is disposed between an end wall 106 of a cylindrical cavity in the end portion 70 of the output member 14 and the end wall 90 connected with the clutch member 56. Thus, the secondary clutch 30 is selectively operable between an engaged condition (FIG. 7) in which the output member 14 and wheel rim 18 are held against rotation relative to the transmission output member 62 and a disengaged condition (FIG. 1) in which the output member 14 and wheel rim 18 are freely rotatable relative to the transmission output member 62 to enable the wheel rim 18 to be rotated when the disc assemblies 34 and 36 are both engaged during towing of the vehicle or other operating conditions.

Actuator Springs

In accordance with another one of the features of the present invention, wear of the actuator springs 40 and 42 is minimized during operation of the drive assembly 10 by minimizing frictional drag on the springs. The annular spring 40 is resiliently deflectable between the active condition of FIG. 2 in which it is effective to cause engagement of the clutch assembly 34 and the inactive condition of FIG. 5 in which it is ineffective to cause engagement of the clutch assembly 34.

When the spring 40 is in the active condition illustrated in FIG. 2, the clutch assembly 34 is engaged so that the ring gear 108 and planet carrier 110 of the planetary gear assembly 16 are rotated at the same speed. A plurality of planet gears 112 are rotatably mounted on the planet carrier 110. Each of the planet gears 112 is rotatably supported by an axle shaft 114 extending between an annular base wall 116 and a support arm 118. Since the clutch 34 is engaged and the ring gear 108 and planet carrier 110 are interconnected, the planet gears 112 are held against rotation about the axle 114 by their meshing engagement with the ring gear 108. If a sun gear 122 is rotated by the input member 24 with the clutch assembly 34 engaged, the planet carrier 110, planet gears 112 and ring gear 108 are rotated together relative to the casing 94 about the central axis of the sun gear 122.

When the spring 40 is in the active condition illustrated in FIG. 2 holding the clutch 34 engaged, the spring engages an annular bearing surface 126 formed on a circular bearing block 128 which is fixedly mounted on the transmission output member 62. The transmission output member 62 is integrally formed with the planet carrier 110. The bearing block 128 is, therefore, rotated with the planet carrier 110. It should be noted that the bearing block 128 abuts an annular bearing ring 132 which is fixedly mounted on the casing 94 to thereby limit leftward (as viewed in FIG. 2) axial movement of the planet carrier 110.

In addition to engaging the bearing surface 126 mounted on the planet carrier 110, the spring 40 presses firmly against an annular bearing surface area 136 formed on an annular piston 138 of the clutch assembly 34. The annular piston 138 has radially inwardly extending teeth 142 which are disposed in meshing engagement with longitudinally extending teeth 144 formed on the planet carrier 110. The piston 138 is rotated about the central axis of the sun gear 122 with the planet carrier 110 and there is no relative rotation between the annular bearing surface 126 on the bearing block 128 and the bearing surface 136 on the piston.

When the clutch assembly 34 is to be released, the motor 44 is operated to move the spring 40 from the active condition of FIG. 2 to the inactive condition of FIG. 5. Upon initiation of operation of the motor 44, an annular piston 148 is moved from the retracted position of FIG. 2 toward the fully extended position of FIG. 5 under the influence of fluid pressure transmitted to an annular recess 150 from the valve 50 and pump 48 (see FIG. 1). As the piston 148 moves toward the left (as viewed in FIG. 2) a flat annular end face 154 on the piston moves into forceful engagement with a circular radially outer end portion 156 of the annular spring 40. Continued outward movement of the piston 148 resiliently deflects the spring 40. This deflection of the spring 40 causes the spring to pivot about the circular line of engagement between a radially inner end portion 158 of the spring 40 and the annular bearing block 128.

This pivotal movement of the spring 40 about the bearing block 128 moves an annular major side surface area 162 on the spring 40 out of engagement with the circular bearing area 136 on the piston 138. The opposite annular major side surface 164 of the spring 40 then moves into engagement with an annular bearing block 166 which is fixedly connected with the casing 94. Continued pivotal movement of the spring 40 under the influence of the motor 44 causes the radially inner portion 158 of the spring to move out of engagement with the annular bearing block 128 as the spring approaches the inactive condition of FIG. 5.

When the spring 40 is in the inactive condition of FIG. 5, it is in engagement with the annular bearing block 166 mounted on an end wall 170 of the casing 94 and a circular inner surface 172 of the casing end wall 170. The spring 40 is also engaged by the piston 148 which is held against rotation relative to the casing 94. The forces resulting from resiliently deflecting the spring 40 are transmitted directly to the casing 94 without the use of a thrust bearing assembly.

Since the spring 40, when in the inactive condition of FIG. 5, is engaged by only surfaces which do not rotate relative to the casing 94, there is no relative movement between the spring 40 and any of the components of the drive assembly 10 which engage the spring. It should be noted that since the clutch assembly 34 is no longer urged to the engaged condition, the planet carrier 110 is free to rotate relative to the ring gear 108 and if the spring 40 had remained in engagement with the annular bearing surface 136 on the piston 138 or with the bearing block 128 which rotate with the carrier 110, the spring 40 would have been worn by frictional engagement therewith. When motor 44 is de-energized, spring 40 acts to return the piston 148. The clutch assembly 34 engages before piston 138 bottoms out. Accordingly, the force of spring 40 causes engagement of the clutch assembly 34 and there is no substantial force between the piston 138 and spring 40. Accordingly, there is minimum wear between these parts.

The annular spring 42 for actuating the brake assembly 36 to the engaged condition is mounted in a recess formed in an end section 178 of the casing 94 (see FIG. 2). An annular piston 180 of the brake assembly 36 has radially extending teeth 182 which engage teeth 184 formed in the end section 178 of the casing 94. Therefore, the piston 180 does not rotate relative to the casing 178. An annular piston 188 of the motor 46 is nonrotatably mounted on the casing 94. The motor piston 188 can be moved outwardly (toward the right as viewed in FIG. 2) from the retracted condition to effect actuation of the spring 42 from the active condition engaging the brake 36 to an inactive condition without danger of causing the spring 42 to engage components of the drive assembly 10 which rotate relative to each other. Thus, there is no possibility of wearing of the spring 42 due to frictional drag on the spring.

Ring Gear Mounting

In accordance with another feature of the invention, the ring gear 108 is connected with the disc pack assemblies 34 and 36 by a pair of axially outwardly extending annular sections 192 and 194 which are integrally formed with the ring gear. The section 192 extends leftwardly (as viewed in FIG. 2) from the ring gear 108 and is engaged by annular discs 198 of a disc pack 200. The discs 198 are slotted at their radially outer ends and engage an annular array of axially extending teeth 204 formed on the inside of the cylindrical section 192. The teeth 204 on the section 192 hold the annular clutch discs 198 against rotation relative to the section 192 and the ring gear 108.

In addition to the discs 198, the disc pack 200 includes annular clutch discs 206 which are interleaved between the discs 198. The clutch discs 206 have slotted radially inner ends which engage an annular array of teeth 144 in the transmission output section 62. The axially extending teeth 144 are parallel to the teeth 204 and are disposed in an annular array which is coaxial with the annular array of teeth 204. The teeth 144 on the transmission output section 62 hold the discs 206 against rotation relative to the planet carrier 110.

The application of pressure against the piston 138 by the annular spring 40 causes the annular major side surfaces of the friction discs 198 and 206 to be pressed into tight frictional engagement to hold the section 192 against rotation relative to the output section 62. This tight frictional engagement is obtained by the application of axially directed spring pressure forces against the piston 138 to compress the annular disc pack 200 between the piston and the wall 116 of the planet carrier 110. It should be noted that when the spring 40 is moved to the inactive position of FIG. 5, the disc pack 200 is no longer compressed between the piston 138 and planet carrier wall 116 so that the friction discs 206 are free to rotate with the planet carrier 110 relative to the friction discs 198 and ring gear 108.

The section 194 extends outwardly from the right (as viewed in FIG. 2) side of the ring gear 108. The annular section 194 has the same internal and external diameter as the annular section 192 and is coaxial with both the section 192 and ring gear 108. Although the section 194 has the same external diameter as the ring gear 108 and the section 192, the ring gear 108 has an inside diameter which is less than the inside diameters of the sections 192 and 194. This enables the two disc pack assemblies 34 and 36 to be mounted in a coaxial relationship within the annular sections 192 and 194 by providing sufficient room for the transmission output section 62 and clutch assembly 56 to be located inwardly of the disc pack assemblies 34 and 36 in a coaxial relationship with the disc pack assemblies 34 and 36 to thereby promote the compact construction of the drive assembly 10.

The section 194 is connected with friction discs 210 (FIG. 2) of a disc pack 212. The annular friction discs 210 have slots formed in their radially outer end sections. The slots in the friction discs 210 engage an annular array of axially extending teeth 216 formed on the inside of the section 194. The teeth 216 on the inside of the section 194 have longitudinal central axes which extend parallel to the longitudinal central axes of the teeth 204 on the section 192 and are located the same distance form the axis of the ring gear 103 as the teeth 204.

Interleaved with the friction discs 210 are friction discs 218. The annular friction discs 218 have slotted inner portions which engage the annular array of teeth 184 formed on the end section 178 of the casing 94 to hold the friction discs 218 against rotation relative to the casing 94. Since the friction discs 210 are held against rotation relative to the section 194 and ring gear 108, upon the application of pressure against the disc pack 212 by the spring 42, the annular major side surfaces of the friction discs 210 are pressed into tight frictional engagement with the annular major side surfaces of the friction discs 218 as the disc pack 212 is compressed between the piston 180 and an annular inner piston 222. The inner piston 222 has a slotted radially inner end section which engages the teeth 184 to hold the piston 222 against rotational movement relative to the casing 94.

Since the sections 192 and 194 are of the same size and are integrally formed with the ring gear 108, the teeth 204, 216 on the sections 192 and 194 can be readily machined during fabrication of the ring gear 108. In addition, the forming of the blank from which the sections 192 and 194 and ring gear 108 are eventually formed is facilitated due to the fact that the sections 192 and 194 have the same inside and outside diameters and are located in a coaxial relationship with the ring gear 108 on opposite sides of the ring gear.

In order to eliminate relatively bulky and expensive bearings and to reduce wear on the annular array of the ring gear teeth 226 (FIG. 2), the ring gear 108 is unrestrained against axial movement relative to the casing 94. Since axial movement of the ring gear 108 is unimpeded by a bearing assembly, the ring gear is free to shift somewhat in an axial direction relative to the casing 94 and planet gears 112. This distributes wear on the ring gear teeth 226 longitudinally of the ring gear teeth. Perhaps an even more important advantage is that the ring gear 108 can be readily mounted in the casing 94 without the necessity of providing space for relatively bulky bearing assemblies.

During operation of the drive assembly 10, the ring gear 108 is supported by engagement of the two side sections 192 and 194 with the discs 198 and 210 of the disc pack assemblies 34 and 36. Since the teeth 204 and 216 on the side sections 192 and 194 are aligned with the central axis of the annular side sections, the side sections can shift axially relative to the friction discs 198 and 210 under the influence of forces applied to the ring gear 108. It should be noted that a cylindrical outer surface 230 of the ring gear 108 and side sections 192 and 194 is spaced apart from and is coaxial with a cylindrical inner surface 232 of the casing 94. Therefore, sidewise or axial movement of the sections 192 and 194 and ring gear 108 is impeded only by the sliding friction between the teeth 204 and 216 and the associated discs 198 and 210. Such movement may occur due to vibration which the assembly will encounter during use.

Drive Motor

Figure 3:
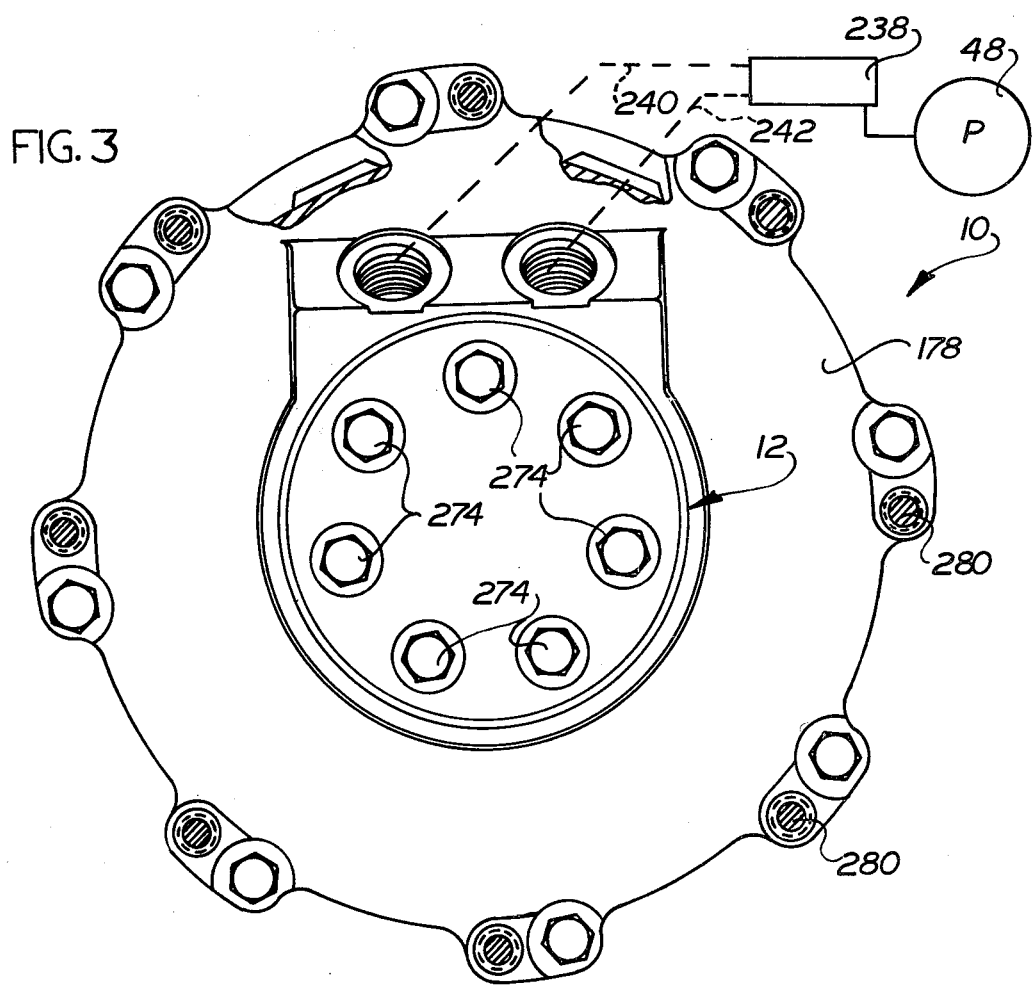
FIG. 3 is a view taken generally along the line 3—3 of FIG. 1 and further illustrating the construction of the drive assembly.

The hydraulic drive motor 12 (see FIG. 1) is mounted on an end of the casing 94 opposite from and coaxial with the output member 14. The drive motor 12 is of the gerotor gear type and is connected with the pump 48 through a valve assembly 238 (see FIG. 3) and conduits 240 and 242. During operation of the hydraulic motor 12 in one direction, high pressure fluid is ported to the conduit 240 and the conduit 242 is connected with drain. During operation of the motor 12 in the opposite direction to effect a reversal in the direction of rotation of the output member 14, high pressure fluid is ported to the conduit 242 and the conduit 240 is connected with drain. During operation of the hydraulic motor 12 in either direction, an externally toothed rotor 246 rotates and orbits relative to an internally tooth stator 248 having one more tooth than the rotor. This combined rotational and orbital movement is generally referred to as hypocycloidal and effects the expansion and contraction of motor chambers in a well known manner. The rotor 246 is connected with the rotatable input member 24 by the wobble shaft 26 which is splined at its opposite ends for connection with the rotor and the input shaft. The splines at both ends of the wobble shaft are curved slightly to afford limited universal pivotal movement of the wobble shaft 26 relative to the output member 24 and rotor 246.

Hydraulic fluid is directed to and from the expanding and contracting chambers formed between the rotor 246 and stator 248 by a valving arrangement which includes a pair of fixed plates 252 and 254 and a movable commutator-valve plate 256. The fixed plates 252 and 254 are circularly shaped and have diameters approximately equal to the diameter of the stator 248.

As the rotor 246 rotates and orbits relative to the stator 248, an axially outer end portion 260 of the wobble shaft 26 causes the commutator-valve plate 256 to rotate about the central axis of the stationary valve plate 254. This movement of the commutator-valve plate 256 ports fluid to and from the various pockets formed between the stator 248 and rotor 246 in the manner described in U.S. Pat. Nos. 3,452,680; 3,601,513 and 3,964,842. Since the cooperation between the commutator-valve plate 256, the rotor 246 and the stator 248 is well known, it will not be further described herein to avoid prolixity of description.

During operation of the motor 12, high pressure fluid is conducted to pockets formed between the rotor 246 and stator 248 to effect rotation of the wobble shaft 26 about its central axis as the wobble shaft orbits about the central axis of the stator 248. The rotational movement of the wobble shaft 26 about its axis is transferred to a cylindrical end section of the input member 24 which is rotatably supported by bearings 264, 266 and 268 in a cylindrical cavity 270 formed in the end section 170 of the casing 94. The cavity 270 is coaxial with the rotational axes of the sun gear 122 and output member 14.

Rotation of the input member 24 under the influence of the motor output shaft 26 rotates the sun gear 122 about its central axis which is coincident with the axis of rotation of the cylindrical transmission output section 62 and the rotatable output member 14. The motor 12 is fixedly connected with the end section 178 of the casing 94 by suitable bolts 274 (see FIGS. 1 and 3). The end section 178 of the casing 94 is in turn fixedly connected with a frame 278 or other section of an associated vehicle by bolts 280 (see FIG. 1).

The casing 94 includes a cylindrical main or body section 284 which is disposed between the two end sections 178 and 170 of the casing. The generally cylindrical casing body section 284 is bolted to the two end sections 170 and 178. The body section 284 has a cylindrical inner surface 232 which is coaxial with the clutches 34 and 36, ring gear 108 and sun gear 122.

Operation of the Drive Awsembly

During operation of the drive assembly 10 to rotate the output member 14 at a relatively low speed relative to the rate of rotation of the input member 24, the valve 50 is actuated to port high pressure fluid to the chamber 150 behind the annular piston 148 to actuate the motor 44 from the retracted condition of FIG. 1 to the extended condition of FIG. 2. This resiliently deflects the spring 40 from the active condition (FIG. 2) to the inactive condition (FIG. 5) to thereby release the clutch assembly 34. An annular chamber 290 behind the piston 188 (see FIG. 2) is connected with drain. The piston 188 remains in the retracted position of FIG. 2 and the spring 42 is effective to apply pressure against the clutch piston 180 to engage the brake assembly 36. Therefore, the ring gear 108 is held against rotation relative to the casing 94 while the planet carrier 110 is free to rotate relative to the casing.

When the assemblies 34 and 36 are in this condition, rotation of the sun gear 122 by the input shaft 24 rotates the planet gear 112 about its central axis. Since the ring gear 108 is held against rotation relative to the casing 94 by the brake assembly 36, the planet gear 112 orbits about the sun gear 122 to rotate the planet carrier 110 about the central axis of the sun gear. As this occurs, the transmission output member 62 rotates the now engaged secondary clutch 30 to rotate the output member 14 and the wheel rim 18. At this time the planet carrier 110 is rotated at a relatively low speed due to the gear reduction obtained in the planetary gear assembly 16.

When it is desired to increase the speed of rotation of the wheel rim 18, the brake assembly 36 is disengaged and the clutch assembly 34 is simultaneously engaged. The brake assembly 36 is disengaged by porting high pressure fluid from the valve 50 to the annular chamber 290 behind the piston 188. This fluid pressure causes the piston 188 to be moved from the retracted position shown in FIG. 2 to an extended position in which the annular spring 42 is resiliently deflected away from the piston 180 to release the disc pack 212. Releasing the disc pack 212 enables the ring gear 108 to be rotated relative to the casing 94.

Simultaneously with the porting of relatively high pressure fluid to the chamber 290 behind the piston 188, the chamber 150 behind the piston 148 of the motor 44 is connected with drain. This results in movement of the piston 148 from the extended position of FIG. 5 to the retracted position of FIG. 2 under the influence of the spring 40. When the piston 148 is retracted, the spring 40 applies pressure against the clutch piston 138 to effect engagement of the clutch assembly 34. Engagement of the clutch assembly 34 causes the friction discs 198 and 206 to hold the ring gear 108 against rotational movement relative to the planet carrier 110 and transmission output section 62.

When the clutch assembly 36 has been disengaged and the clutch assembly 34 engaged, the planet gears 112 can not rotate about their own central axes since the planet carrier 110 is held against rotation relative to the ring gear 108 by the clutch assembly 34. Rotation of the sun gear 122 about its central axis is effective to rotate the planet gears 112, ring gear 108, planet carrier 110, clutch assembly 34, spring 40 and transmission output section 62 about the central axis of the sun gear 122 at the same speed that the sun gear is rotated by the input shaft 24. Therefore, the output section 14 and wheel rim 18 are rotated by the engaged clutch 30 at the same speed as the input shaft 24 is driven by the motor 12.

If it is desired to effect free wheeling operation of the drive assembly 10, both of the assemblies 34 and 36 are disengaged. This is accomplished by porting high pressure fluid to the two piston chambers 150 and 290 from the valve assembly 50. This moves the pistons 148 and 188 to the extended positions to flex the associated springs 40 and 42 away from the disc assemblies 34 and 36 to thereby effect disengagement of the disc assemblies. Once the assemblies 34 and 36 have been disengaged, the ring gear 108 and planet carrier 110 are both freely rotatable relative to the casing 94. If any resistance to rotational movement is applied to the output member 14 by the wheel of a vehicle, which will normally be the case, rotation of the sun gear 122 results in rotation of the planet gears 112 and ring gear 108 relative to the casing. The planet carrier 110 rotates with the output member 14 relative to the casing at whatever speed the free wheeling operation of the drive assembly 10 results in rotation of the wheel rim 18.

When the wheel rim 18 is to be held against rotation relative to the casing 94, i.e. braked, the valve assembly 238 is actuated to interrupt the flow of fluid to the motor 12. Simultaneously therewith, the valve assembly 50 is actuated to effect operation of both of the assemblies 34 and 36 to the engaged condition. Since the motor 12 is not being operated, the sun gear 122 is not rotated. Actuation of both of the assemblies 34 and 36 to the engaged condition lock ring gear 108 against rotation relative to the planet carrier 110 and locks the planet carrier against rotation relative to the casing 94. Thus, the engaged clutch assembly 34 locks the planet carrier 110 to the ring gear 108. The engaged brake assembly 36 locks the ring gear 108 to the casing 94. Therefore, the transmission output section 62, which is integrally formed with the planetary carrier 110, is locked against rotation relative to the casing 94. Since the towing clutch 30 is engaged, the wheel rim 18 is held against rotation relative to the casing 94 and the frame 278 of the vehicle.

If it is desired to have free wheeling rotation of the output member 14 when both assemblies 34 and 36 are engaged, it is merely necessary to operate the secondary or towing clutch 30 to the disengaged condition. This is accomplished by rotating clutch actuator knob 74 to effect a shifting movement of the clutch member 54 from the engaged position to FIG. 7 to the disengaged position of FIGS. 1 and 2. When this has occurred, the output member 14 and wheel rim 18 are free to rotate relative to the casing 94 even though both disc assemblies 34 and 36 are engaged.

Summary

In view of the foregoing description it is apparent that an improved drive assembly 10 includes a planetary gear assembly 16 and a clutch 34 and a brake 36 to effect a variation in the speed of rotation of an output member 14 relative to the speed of rotation of an input member 24. The clutch 34 and brake 36 are actuated from an engaged condition (FIG. 2) to a disengaged condition (FIG. 5) under the influence of fluid pressure. If the clutches 30, 34 and brake 36 are in the engaged condition, the drive assembly 10 is locked in such a manner that the output member 14 can not rotate. In order to enable the output member 14 to be rotated when the pump 48 is ineffective to supply fluid under pressure, the secondary or towing clutch 30 is provided in association with the output from the drive assembly. By releasing the secondary clutch 30, the output member 14 can be freely rotated.

In accordance with another feature of the present invention, wear between various parts of the drive assembly 10 is minimized. Specifically, springs 40 and 42 are associated with the planetary gear assembly 16 in such a manner as to minimize wear.

The ring gear 108 of the planetary gear assembly 16 is free to shift axially relative to the planet gears 112 to thereby distribute the ring gear tooth wear caused by the planet gear teeth over a relatively large area of the ring gear teeth 226. The freedom of the ring gear 108 to shift axially is obtained by eliminating relatively bulky and expensive bearing arrangements which have been previously utilized to support the ring gear for rotation and to hold the ring gear against axial movement relative to the planet gears. The compact construction of the drive assembly 10 is further promoted by providing a relatively simple interconnection between the ring gear 108 and disc pack 34 and brake 36 which are utilized to retard relative rotation between the ring gear and either the planet carrier 110 or the casing 94 of the drive assembly. This simple interconnection is obtained by forming the ring gear with a pair of side sections 192 and 194 having teeth or splines 204 and 216 which engage discs 198 and 210. The teeth or splines 204 and 216 on the two side sections 192 and 194 have the same diameter to facilitate the forming of the ring gear and side sections.

What is claimed is:

1. A drive assembly for use in driving a driven member, said drive assembly comprising a casing, a planetary gear assembly disposed within said casing, said planetary gear assembly including a sun gear, a ring gear, a planet carrier, and a planet gear on said planet carrier connected with said sun and ring gears, input means for effecting rotation of at least one of said gears, output means connected with said planetary gear assembly for effecting rotation of the driven member, said output means including a first section connected with said planet carrier and a second section to be connected with the driven member for rotation therewith, brake means operable from an engaged condition to a disengaged condition, said brake means being effective in the engaged condition to hold said first output section and said one gear against rotation relative to said casing, said brake means being effective in the disengaged condition to enable said first output section and said one gear to be rotated relative to said casing, and clutch means operable between an engaged condition interconnecting said first and second output sections and a disengaged condition enabling said second output section to be rotated relative to said first output section and said casing when said brake means is in said engaged condition, said clutch means including a clutch member encircling said second section and movable between a first position engaging said first and second output sections and a second position spaced from one of said output sections, spring means for urging said clutch member toward said first position and retaining means for retaining said clutch member in said second position against the influence of said spring means, said retaining means comprising a rod having a threaded connection with said clutch member and which upon rotation thereof in one direction effects movement of said clutch member to said second position due to said threaded connection and retains said clutch member thereat.

2. A drive assembly as defined in claim 1 wherein said clutch member comprises an annular gear member having internal splines for engaging external splines on said second section and external splines for engaging internal splines on said first section.

3. A drive assembly as defined in claim 2 wherein said clutch member further includes a plate secured to said annular gear member, said plate and said rod having said threaded connection, and said rod extends through a passage in said second section and is rotatable relative thereto.

4. A drive assembly for driving a driven member, said drive assembly comprising a casing, a planetary gear assembly disposed within said casing, said planetary gear assembly comprising a sun gear, a planet carrier, a planet gear rotatably mounted on said planet carrier and connected with said sun gear, and a rotatable annular ring gear disposed in meshing engagement with said planet gear, input means for effecting rotation of at least one of said gears, output means connected with said planet carrier for effecting rotation of the driven member, a first annular section connected to said ring gear for rotation therewith and extending axially outwardly from a first side of said ring gear, a second annular section connected to said ring gear for rotation therewith and extending axially outwardly from a second side of said ring gear, said first and second annular sections being coaxial and having the same inside diameters, a first annular disc pack circumscribed by said first annular section and connected with said planet carrier and said first annular section, a second annular disc pack circumscribed by said second annular section and connected with said casing and said second annular section, means for actuating said first disc pack to retard relative rotation between said first annular section and said planet carrier, and means for actuating said second disc pack to retard relative rotation between said second section and said casing.

5. An assembly as set forth in claim 4 further including a first set of teeth disposed in an annular array on the inside of said first annular section and disposed in engagement with said first annular disc pack, a second set of teeth disposed in an annular array on the inside of said second annular section and disposed in engagement with said second annular disc pack, and said first and second sets of teeth being located equal distances from the axis of said ring gear, and said first and second disc packs comprise means supporting said ring gear for axial and rotational movement unimpeded by bearings and said ring gear is free to move axially relative to said planet gear.

6. An assembly as defined in claim 5 wherein said first and second annular sections are integrally formed with said ring gear.

7. An assembly as set forth in claim 6 wherein said output means includes a first output section of said planet carrier adapted to be rotated by said planetary gear assembly and a second output section adapted to be connected with the driven member for rotation therewith, clutch means operable between an engaged condition interconnecting said first and second output sections to enable rotational drive forces to be transmitted therebetween and a disengaged condition enabling said second output section to be rotated relative to said first output section and said casing.

8. An assembly as set forth in claim 7 wherein said clutch means includes a clutch member encircling said second section and movable between a first position engaging said first and second output sections and a second position spaced from one of said output sections, spring means for urging said clutch member toward said first position and retaining means for retaining said clutch member in said second position against the influence of said spring means, said retaining means comprising a rod having a threaded connection with said clutch member and which upon rotation thereof in one direction effects movement of said clutch member to said second position due to said threaded connection and retains said clutch member thereat.

9. An assembly as set forth in claim 4 wherein said means for actuating said first disc pack includes a first annular disc spring member disposed adjacent to and axially outwardly of an end portion of said first annular section, said first annular disc spring member having an outside diameter which is greater than the outside diameters of said first annular section and said ring gear and an inside diameter which is less than the inside diameters of said first annular section and said ring gear, said means for actuating said second disc pack including a second annular disc spring member disposed adjacent to and axially outwardly of an end portion of said second annular section, said second annular disc spring member having an outside diameter which is greater than the outside diameters of said second annular section and said ring gear and an inside diameter which is less than the inside diameters of said second annular section and said ring gear.

10. A drive assembly for use in driving a driven member, said drive assembly comprising a casing, a planetary gear assembly in said casing, said planetary gear assembly comprising a rotatable sun gear, a rotatable ring gear, a rotatable planet gear connected with said sun and ring gears, and a planet carrier supporting said planet gear for movement relative to said ring gear about the axis of rotation of said sun gear, input means for effecting rotation of at least one of said gears, output means connected with said planetary gear assembly for effecting rotation of the driven member, clutch means operable between an engaged condition holding said planet carrier and ring gear against movement relative to each other and a disengaged condition in which said clutch means is ineffective to hold said planet carrier and ring gear against movement relative to each other, said clutch means being rotatable relative to said casing about the axis of rotation of said sun gear with said planet carrier and ring gear when said clutch means is in said engaged condition, and a disc spring operable between an active condition urging said clutch means to the engaged condition and an inactive condition in which said disc spring is ineffective to urge said clutch means to the engaged condition, said disc spring being spaced from said casing and acting between a first bearing surface area on said planet carrier and a second bearing surface area on said clutch means when said disc spring is in the active condition to enable said disc spring to rotate relative to said casing with said planet carrier and clutch means, said disc spring being spaced from said planet carrier and clutch means and acting against a third bearing surface area on said casing when said disc spring is in the inactive condition to enable said planet carrier and first clutch means to rotate relative to said disc spring when said disc spring is in the inactive condition, and means for moving said disc spring between its active and inactive conditions.

11. An assembly as set forth in claim 10 wherein said spring has a natural resilience which urges it from the inactive condition toward the active condition, said means for moving said spring includes a fluid motor means connected with said casing, and said second bearing surface on said clutch means comprising a continuous annular bearing surface encircling the axis of rotation of said ring gear.

12. An assembly as set forth in claim 11 wherein said fluid motor means effects pivotal movement of said spring away from said first bearing surface area about said third bearing surface area upon initiation of movement of said spring from said active condition toward said inactive condition.

13. An assembly as set forth in claim 11 wherein said spring includes an annular member having a pair of opposite side surface areas interconnecting a circular inner rim portion and a circular outer rim portion, said inner rim portion being disposed in engagement with said first bearing surface area and one of said side surface areas being disposed in engagement with said second bearing surface area when said spring is in the active condition, said inner rim portion and one side surface area of said spring being spaced from said first and second bearing surface areas and the side surface area opposite from said one side surface area being disposed in engagement with said third bearing surface area when said spring is in said inactive condition.

14. An assembly as set forth in claim 13 wherein said fluid motor includes means for applying a force to said circular outer rim portion of said spring to effect operation of said spring from the active condition to the inactive condition.

15. An assembly comprising a casing, first and second rotatable members in said casing, a clutch having engaged and disengaged conditions interposed between said first and second members, a disc spring encircling the axis of rotation of one of said members and biasing said clutch to said engaged condition and having an active condition when said clutch is engaged and an inactive condition when it is disengaged, means for causing said disc spring to rotate with said first rotatable member when said disc spring is in its active condition, and means for preventing rotation of said disc spring with said first or second member when said disc spring is in its inactive condition, said means for causing said disc spring to rotate comprising a first bearing surface area connected with said first rotatable member when said disc spring is in the active condition and against which said disc spring acts, and said means for preventing rotation of said disc spring comprising means for moving said disc spring to its inactive condition away from said first bearing surface area and into engagement with a second bearing surface area on said casing, thereby enabling said first bearing surface area to rotate relative to said disc spring when said disc spring is in the inactive condition, said clutch including a clutch member rotatable with said first rotatable member, said disc spring acting against a third bearing surface area on said clutch member and said first bearing surface area when said disc spring is in said active condition to enable said disc spring to rotate relative to said casing with said first rotatable member and clutch member, said third bearing surface area being a continuous annular area encircling the axis of rotation of the second rotatable member, said disc spring having an annular configuration with circular inner and outer edge portions interconnected by opposite side surfaces, said circular inner and outer edge portions being movable axially relative to each other to resiliently flex said disc spring between said active and inactive conditions, said first bearing surface area being disposed in engagement with one of said side surface areas when said disc spring is in the active condition, and said third bearing surface area being disposed in engagement with the second side surface area opposite from said one side surface area when said disc spring is in said active condition.

16. An assembly as defined in claim 15 wherein said second bearing surface area on said casing engages said one side surface area at a location spaced from where said first bearing surface area engages said one side surface area, and said second bearing surface area comprising means for pivoting said disc spring away from said first bearing surface area upon actuation of said means for moving said disc spring to its inactive condition.

17. A drive assembly for use in driving a driven member, said drive assembly comprising a casing, a planetary gear assembly including a ring gear and a planet carrier rotatably supported in said casing, a clutch having engaged and disengaged conditions interposed between said ring gear and planet carrier, a disc spring encircling the axis of rotation of said planet carrier and biasing said clutch to said engaged condition and having an active condition when said clutch is engaged and in an inactive condition when it is disengaged, means for causing said disc spring to rotate with said planet carrier when said disc spring is in its active condition, and means for preventing rotation of said disc spring with said ring gear or said planet carrier when said disc spring is in its inactive condition, said means for causing said disc spring to rotate comprising a first bearing surface area connected with said planet carrier when said disc spring is in the active condition and against which said disc spring acts, and said means for preventing rotation of said disc spring comprises means for moving said disc spring to its inactive condition away from said first bearing surface area and into engagement with a second bearing surface area on said casing, thereby enabling said first bearing surface area to rotate relative to said disc spring when said disc spring is in the active condition.

18. A drive assembly as set forth in claim 17 wherein said clutch includes a clutch member rotatable with said ring gear, and said disc spring acting against a bearing surface area on said clutch member and said first bearing surface on said planet carrier when said disc spring is in said active condition to enable said disc spring to rotate relative to said casing with planet carrier and clutch member, said bearing surface area on said clutch member being a continuously annular area encircling the axis of rotation of the ring gear.

* * * * *